US010096829B2

(12) United States Patent
Mizawa et al.

(10) Patent No.: US 10,096,829 B2
(45) Date of Patent: Oct. 9, 2018

(54) NONAQUEOUS ELECTROLYTE SECONDARY BATTERIES

(71) Applicant: Sanyo Electric Co., Ltd., Daito-shi, Osaka (JP)

(72) Inventors: Atsushi Mizawa, Osaka (JP); Junichi Sugaya, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/126,056

(22) PCT Filed: Mar. 10, 2015

(86) PCT No.: PCT/JP2015/001294
§ 371 (c)(1),
(2) Date: Sep. 14, 2016

(87) PCT Pub. No.: WO2015/146024
PCT Pub. Date: Oct. 1, 2015

(65) Prior Publication Data
US 2017/0084917 A1    Mar. 23, 2017

(30) Foreign Application Priority Data
Mar. 27, 2014    (JP) .................................. 2014-065189

(51) Int. Cl.
*H01M 4/525*        (2010.01)
*H01M 4/131*        (2010.01)
(Continued)

(52) U.S. Cl.
CPC ......... *H01M 4/525* (2013.01); *H01M 2/1673* (2013.01); *H01M 4/131* (2013.01);
(Continued)

(58) Field of Classification Search
CPC ........ H01M 4/48; H01M 4/62; H01M 2/1673; H01M 4/483; H01M 4/131; H01M 10/052;
(Continued)

(56) References Cited

U.S. PATENT DOCUMENTS 6,287,720 B1    9/2001    Yamashita et al.
2002/0062138 A1*    5/2002    Gan .................... H01M 4/0404
607/9

(Continued)

FOREIGN PATENT DOCUMENTS

CN          1134078 C       1/2004
CN         102047474 A      5/2011
(Continued)

OTHER PUBLICATIONS

International Search Report dated Jun. 9, 2015, issued in counterpart International Application No. PCT/JP2015/001294 (2 pages).
(Continued)

*Primary Examiner* — Alex Usyatinsky
(74) *Attorney, Agent, or Firm* — Westerman, Hattori, Daniels & Adrian, LLP

(57) ABSTRACT

A nonaqueous electrolyte secondary battery attains both a high capacity and excellent low-temperature characteristics. A nonaqueous electrolyte secondary battery includes a positive electrode, a negative electrode, a separator, a nonaqueous electrolyte and a battery case accommodating the battery constituents, the positive electrode having a positive electrode mixture layer including a lithium transition metal oxide and a conductive auxiliary, the lithium transition metal oxide containing at least Ni. The percentage of Ni in the total moles of metal element(s) except lithium present in the oxide is not less than 88 mol %, the content of the conductive auxiliary being not less than 0.75 parts by mass and not
(Continued)

more than 1.25 parts by mass, the ratio of the lithium transition metal oxide being not less than 25 parts by volume in the inside of the battery case.

8 Claims, 3 Drawing Sheets

(51) Int. Cl.
| | |
|---|---|
| *H01M 4/505* | (2010.01) |
| *H01M 10/052* | (2010.01) |
| *H01M 2/16* | (2006.01) |
| *H01M 4/48* | (2010.01) |
| *H01M 4/62* | (2006.01) |
| *H01M 10/0525* | (2010.01) |
| *H01M 4/36* | (2006.01) |

(52) U.S. Cl.
 CPC .......... *H01M 4/483* (2013.01); *H01M 4/505* (2013.01); *H01M 4/625* (2013.01); *H01M 10/052* (2013.01); *H01M 10/0525* (2013.01); *H01M 4/366* (2013.01); *Y02T 10/7011* (2013.01)

(58) Field of Classification Search
 CPC ...... H01M 4/625; H01M 4/505; H01M 4/366; Y02T 10/7011
 See application file for complete search history.

(56) References Cited

U.S. PATENT DOCUMENTS

| | | | |
|---|---|---|---|
| 2006/0216609 A1* | 9/2006 | Abe | H01M 4/13 429/246 |
| 2009/0311585 A1 | 12/2009 | Muraoka et al. | |
| 2010/0255374 A1* | 10/2010 | Nemoto | H01M 2/1653 429/221 |
| 2011/0104569 A1* | 5/2011 | Sugaya | H01M 4/131 429/220 |
| 2013/0337325 A1* | 12/2013 | Jung | H01M 4/483 429/218.1 |
| 2014/0322591 A1* | 10/2014 | Yamamoto | H01M 4/587 429/164 |

FOREIGN PATENT DOCUMENTS

| | | | |
|---|---|---|---|
| CN | 103947029 A | | 7/2014 |
| EP | 0848435 | * | 6/1998 |
| JP | 2005-123047 A | | 5/2005 |
| JP | 2008-262832 A | | 10/2008 |
| JP | 2011-113863 A | | 6/2011 |
| JP | 2011-134535 A | | 7/2011 |
| JP | 2013-254639 A | | 12/2013 |
| TW | 200933955 A | | 8/2009 |
| WO | WO2013099263 A | * | 7/2013 |

OTHER PUBLICATIONS

English translation of Search Report dated May 3, 2018, issued in counterpart Chinese Application No. 201580016846.7. (2 pages).

* cited by examiner (a)

(b)

(c)

(a)

(b)

(c)

NONAQUEOUS ELECTROLYTE SECONDARY BATTERIES

TECHNICAL FIELD

The present invention relates to nonaqueous electrolyte secondary batteries.

BACKGROUND ART

With the recent accelerated reduction in the size and weight of mobile information terminals such as cellphones, laptop computers and smartphones, there is a demand for higher capacities of batteries that power such devices. Nonaqueous electrolyte secondary batteries, which are charged and discharged by the movement of lithium ions between positive and negative electrodes, have a high energy density and a high capacity and are widely used as power supplies for driving the above mobile information terminals.

Further, nonaqueous electrolyte secondary batteries recently attract attention as power supplies for powering electric vehicles, electric tools and the like, and are expected to find a wider range of applications. Batteries as power supplies for such vehicles and electric tools are required to have a high capacity for long use and also to have excellent cycle characteristics. In particular, vehicle-mounted applications increasingly demand that not only cycle characteristics but also low-temperature characteristics be enhanced.

To realize batteries having a high capacity and excellent cycle characteristics, for example, Patent Literature 1 presents a nonaqueous secondary battery that includes a positive electrode which has a positive electrode mixture layer containing a Li transition metal oxide represented by the composition formula $Li_{1+y}MO_2$ ($-0.3 \leq y \leq 0.3$, M denotes two or more kinds of elements including Ni, and the percentage of Ni in M is 30 mol % to 95 mol %), a negative electrode which has a negative electrode mixture layer containing $SiO_x$ ($0.5 \leq x \leq 1.5$) and graphite, and a nonaqueous electrolyte, wherein the battery is configured so that the potential of the negative electrode when the battery is discharged to 2.5 V is not more than 1.0 V versus Li.

CITATION LIST

Patent Literature

PTL 1: Japanese Published Unexamined Patent Application No. 2011-113863

SUMMARY OF INVENTION

Technical Problem

The simultaneous satisfaction of capacity and low-temperature characteristics obtained according to Patent Literature 1 is still insufficient and thus further improvements are demanded. In one aspect, the present invention has an object of providing a nonaqueous electrolyte secondary battery which attains both a high capacity and excellent low-temperature characteristics.

Solution to Problem

To achieve the above object, an aspect of the present invention resides in a nonaqueous electrolyte secondary battery including a positive electrode, a negative electrode, a separator, a nonaqueous electrolyte and a battery case accommodating the battery constituents, the positive electrode having a positive electrode mixture layer including a lithium transition metal oxide and a conductive auxiliary, the lithium transition metal oxide containing at least Ni wherein the percentage of Ni in the total moles of metal element(s) except lithium present in the oxide is not less than 88 mol %, the content of the conductive auxiliary being not less than 0.75 parts by mass and not more than 1.25 parts by mass per 100 parts by mass of the lithium transition metal oxide, the ratio of the lithium transition metal oxide being not less than 25 parts by volume in the inside of the battery case.

Advantageous Effects of Invention

The nonaqueous electrolyte secondary battery according to one aspect of the present invention attains enhanced low-temperature characteristics while ensuring a high capacity.

BRIEF DESCRIPTION OF DRAWINGS

FIG. 2 is a set of schematic views illustrating a positive electrode used in the nonaqueous electrolyte secondary battery of FIG. 1 wherein FIG. 2(a) is a top view of the positive electrode, FIG. 2(b) is a sectional view of the positive electrode and FIG. 2(c) is a bottom view of the positive electrode.

FIG. 3 is a set of schematic views illustrating a negative electrode used in the nonaqueous electrolyte secondary battery of FIG. 1 wherein FIG. 3(a) is a top view of the negative electrode, FIG. 3(b) is a sectional view of the negative electrode and FIG. 3(c) is a bottom view of the negative electrode.

DESCRIPTION OF EMBODIMENTS

Figure 1:
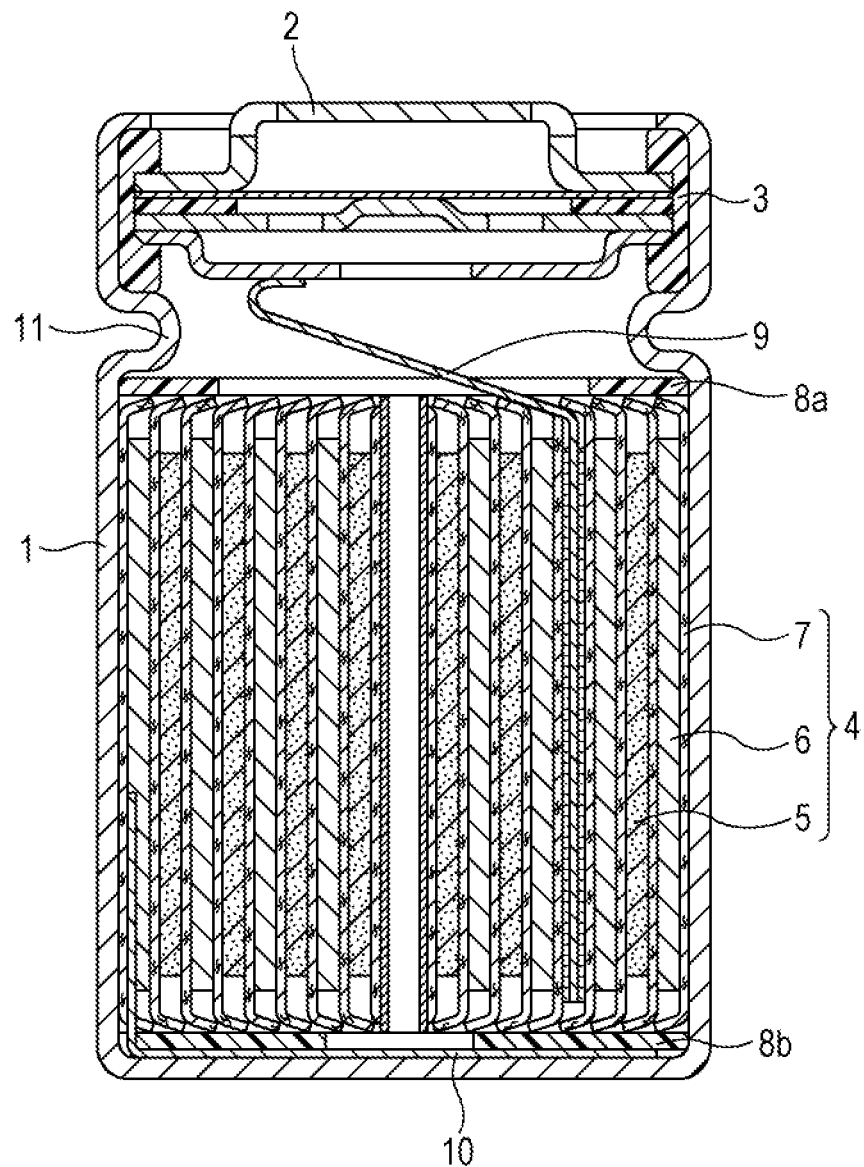
FIG. 1 is a schematic sectional view illustrating a general structure of a nonaqueous electrolyte secondary battery according to an embodiment of the present invention.

Hereinbelow, embodiments of the invention will be described. The embodiments illustrate some examples for carrying out the invention. The scope of the invention is not limited to those embodiments, and appropriate modifications are possible without departing from the spirit of the invention. The figures that are referred to in the explanation of the embodiments are schematic, and therefore the configuration such as sizes of the constituents illustrated in the figures may differ from the actual ones.

<Nonaqueous Electrolyte Secondary Batteries>

A nonaqueous electrolyte secondary battery according to an embodiment includes a positive electrode, a negative electrode, a separator, a nonaqueous electrolyte and a battery case accommodating these battery constituents. The positive electrode has a positive electrode mixture layer including a lithium transition metal oxide and a conductive auxiliary. The lithium transition metal oxide contains at least Ni, and the percentage of Ni in the total moles of metal element(s) except lithium present in the oxide is not less than 88 mol %. The content of the conductive auxiliary is not less than 0.75 parts by mass and not more than 1.25 parts by mass per 100 parts by mass of the lithium transition metal oxide. The ratio of the lithium transition metal oxide is not less than 25 parts by volume in the inside of the battery case.

Studies by the present inventor have found that while the above lithium transition metal oxide containing 88 mol % or more Ni can realize a high capacity when used as a positive electrode active material as compared to lithium transition metal oxides that are free from Ni or contain less than 88 mol % Ni such as $LiCoO_2$, $LiFePO_4$, $LiMn_2O_4$, $LiNi_{0.4}Co_{0.6}O_2$ and $LiNi_{0.4}Mn_{0.6}O_2$, such a material exhibits a large temperature dependence during discharging and thus causes poor low-temperature characteristics.

As described above, the nonaqueous electrolyte secondary battery according to the present embodiment is configured so that the lithium transition metal oxide contains Ni in a ratio of not less than 88 mol %, and also so that the content of the conductive auxiliary is limited to the range of 0.75 parts by mass to 1.25 parts by mass, and the ratio of the lithium transition metal oxide is limited to not less than 25 parts by volume in the inside of the battery case. With this configuration, the electrode plate resistance of the positive electrode is moderately increased to cause the positive electrode to generate heat, and thereby the nonaqueous electrolyte secondary battery attains excellent low-temperature characteristics while ensuring a high capacity. The reasons for such effects will be described below.

With the above configuration, the electrode plate resistance of the positive electrode can be moderately increased by the use of the lithium transition metal oxide which contains 88 mol % or more Ni and has a high powder resistivity and also by limiting the content of the conductive auxiliary to the aforementioned range. Consequently, the positive electrode is allowed to generate heat. At the same time, the ratio of the lithium transition metal oxide is limited to not less than 25 parts by volume in the inside of the battery case. Because the positive electrode occupies a large proportion of the volume of the battery case, the amount of heat generated by the positive electrode in the inside of the battery case can be increased. That is, the above configuration allows the positive electrode to generate heat efficiently in the limited space in the battery case. While the lithium transition metal oxide with a high percentage of Ni has a large temperature dependence and performs poorly at low temperatures, its characteristics are easily enhanced when the temperature is elevated. This is probably the reason why low-temperature characteristics are enhanced by the generation of heat by the positive electrode.

FIG. 1 is a sectional view schematically illustrating a general structure of a nonaqueous electrolyte secondary battery according to an embodiment of the present invention. The nonaqueous electrolyte secondary battery has an electrode assembly 4 in which a long positive electrode 5 and a long negative electrode 6 are wound together while separators 7 are interposed between the positive electrode 5 and the negative electrode 6. A bottomed cylindrical battery case 1 made of a metal accommodates the electrode assembly 4 and a nonaqueous electrolyte that is not shown.

In the electrode assembly 4, a positive electrode lead 9 is electrically connected to the positive electrode 5, and a negative electrode lead 10 is electrically connected to the negative electrode 6. The electrode assembly 4 is accommodated in the battery case 1 together with a lower insulating ring 8b while the positive electrode lead 9 leads out from the assembly. A sealing plate 2 is welded to the end of the positive electrode lead 9, and thereby the positive electrode 5 and the sealing plate 2 are electrically connected to each other. The lower insulating ring 8b is disposed between the bottom surface of the electrode assembly 4 and the negative electrode lead 10 leading out from the electrode assembly 4 in the downward direction. The negative electrode lead 10 is welded to the inner bottom surface of the battery case 1, and thereby the negative electrode 6 and the battery case 1 are electrically connected to each other. An upper insulating ring 8a is disposed on the top surface of the electrode assembly 4.

The electrode assembly 4 is held in the battery case 1 by a step 11 that protrudes inwardly at an upper portion of the sidewall of the battery case 1 above the upper insulating ring 8a. The sealing plate 2 that is fitted with a gasket 3 made of a resin along its periphery is disposed on the step 11, and the open end of the battery case 1 is crimped inwardly to form a seal.

FIG. 2(a), FIG. 2(b) and FIG. 2(c) are a top view, a sectional view and a bottom view, respectively, schematically illustrating the positive electrode 5 used in the nonaqueous electrolyte secondary battery of FIG. 1. FIG. 3(a), FIG. 3(b) and FIG. 3(c) are a top view, a sectional view and a bottom view, respectively, schematically illustrating the negative electrode 6 used in the nonaqueous electrolyte secondary battery of FIG. 1.

The positive electrode 5 includes a long positive electrode current collector 5a, and positive electrode mixture layers 5b disposed on both sides of the positive electrode current collector 5a. On both sides of the positive electrode current collector 5a, portions 5c and 5d of the positive electrode current collector are exposed from the positive electrode mixture layer 5b at central regions of the surface in the longitudinal direction so as to extend across the width direction. The end of the positive electrode lead 9 is welded to the exposed portion 5c of the positive electrode current collector.

The negative electrode 6 includes a long negative electrode current collector 6a, and negative electrode mixture layers 6b disposed on both sides of the negative electrode current collector 6a. At one end of the negative electrode 6 in the longitudinal direction, equally sized portions 6c and 6d of the negative electrode current collector are exposed from the negative electrode mixture layer 6b on both sides of the negative electrode 6. At the other end of the negative electrode 6 in the longitudinal direction, portions 6e and 6f of the negative electrode current collector are exposed from the negative electrode mixture layer 6b on both sides of the negative electrode 6. The widths of the exposed portions 6e and 6f of the negative electrode current collector (the lengths in the longitudinal direction of the negative electrode 6) are such that the exposed portion 6f of the current collector extends farther than the exposed portion 6e of the negative electrode current collector. The end of the negative electrode lead 10 is welded to the exposed portion 6f of the negative electrode current collector in the vicinity of the end of the negative electrode 6 in the longitudinal direction. This arrangement of the leads allows for efficient penetration of the nonaqueous electrolyte through the central regions of the positive electrode in the longitudinal direction and through the ends of the negative electrode in the longitudinal direction.

The structure of the electrode assembly, and the battery case of the nonaqueous electrolyte secondary battery according to the present embodiment of the invention are not limited to those described above. For example, the structure of the electrode assembly may be a stack type in which positive electrodes and negative electrodes are stacked alternately via separators. The battery case may be a metallic prismatic battery case or an aluminum laminate film. In particular, a cylindrical battery is preferable in view of the fact that the heat release which is detrimental to the generation of heat by the positive electrode is small and the positive electrode can easily generate heat efficiently in the inside of the battery case. Examples of the metal materials for forming the battery cases include aluminum, aluminum alloys (for example, alloys containing trace amounts of metals such as manganese and copper) and steel plates. Where necessary, the battery case may be plated with nickel or the like. The positive electrode mixture layer may be disposed on only one side of the positive electrode current collector. Similarly, the negative electrode mixture layer may be disposed on only one side of the negative electrode current collector.

Hereinbelow, the constituents will be described in more detail.

[Positive Electrodes]

The positive electrode current collector may be a nonporous conductive substrate or may be a porous conductive substrate having a plurality of through-holes. Examples of the nonporous conductive substrates include metal foils and metal sheets. Examples of the porous conductive substrates include metal foils having connected holes (pores), meshes, nets, punched sheets, expanded metals and lath materials. Examples of the metal materials used as the positive electrode current collectors include stainless steel, titanium, aluminum and aluminum alloys.

For example, the thickness of the positive electrode current collector may be selected from the range of 3 to 50 μm, and is preferably 5 to 30 μm, and more preferably 10 to 20 μm.

The positive electrode mixture layers include a positive electrode active material and a conductive auxiliary and may further contain additives such as, for example, a binder and a thickener as required.

The positive electrode active material is a lithium transition metal oxide that contains lithium and a metal element(s). The lithium transition metal oxide contains lithium and at least Ni as the metal element, and the percentage of Ni in the total moles of metal elements except lithium present in the lithium transition metal oxide is not less than 88 mol %. As long as these conditions are satisfied, any known positive electrode active material capable of storing and releasing lithium ions may be used. If the percentage of Ni is less than 88 mol %, the lithium transition metal oxide exhibits so low a powder resistivity that the positive electrode cannot generate sufficient heat and fails to provide the aforementioned enhancement in low-temperature characteristics. The positive electrode active material is usually used in the form of particles.

Examples of the metal elements other than Ni include transition metal elements such as Co and Mn, and non-transition metal elements such as Mg and Al. The metal element may be partially substituted with a dissimilar element. The surface of the particles of the lithium transition metal oxide may be coated with a dissimilar element. Examples of the dissimilar elements include Na, Sc, Y, Cu, Zn, Cr, Pb, Sb, B, Ti, V, Fe, Nb, Mo, Zr, Sn, W and K. The positive electrode active material may be a single lithium transition metal oxide described above or may be a combination of two or more kinds of such oxides.

More preferably, the lithium transition metal oxide is an oxide represented by the general formula: $Li_aNi_xM_{1-x}O_2$ (wherein $0.95 \leq a \leq 1.2$, $0.88 \leq x \leq 1.0$, and M is at least one element selected from Co, Mn and Al).

Particularly preferably, the lithium transition metal oxide is an oxide represented by the general formula: $Li_aNi_xCo_yAl_zO_2$ (wherein $0.95 \leq a \leq 1.2$, $0.88 \leq x < 1.0$, $0 < y < 0.1$, $0 < z < 0.1$, and $x+y+z=1.0$).

To attain a high capacity and to enhance low-temperature characteristics, the proportion of x in the general formula is particularly preferably $0.90 < x \leq 0.95$.

Preferred specific examples of the lithium transition metal oxides include $LiNi_{0.88}Co_{0.09}Al_{0.03}O_2$, $LiNi_{0.91}Co_{0.06}Al_{0.03}O_2$ and $LiNi_{0.94}Co_{0.03}Al_{0.03}O_2$. The lithium transition metal oxide may be partially substituted with other element such as fluorine in place of oxygen.

The positive electrode may be obtained by, for example, applying a positive electrode mixture slurry which includes positive electrode mixture layer components such as the positive electrode active material, a conductive auxiliary and a binder in a dispersion medium, to a surface of the positive electrode current collector, and rolling the resultant coating with a pair of rolls or the like followed by drying to form a positive electrode mixture layer on the surface of the positive electrode current collector. Where necessary, the coating may be dried before the rolling.

The conductive auxiliary may be a known material, with examples including carbon blacks such as acetylene black; conductive fibers such as carbon fibers and metal fibers; and carbon fluorides. The conductive auxiliaries may be used singly, or two or more may be used in combination.

The content of the conductive auxiliary in the positive electrode (the positive electrode mixture layer) is suitably not less than 0.5 parts by mass and not more than 1.5 parts by mass per 100 parts by mass of the positive electrode active material. If the content of the conductive auxiliary is less than 0.5 parts by mass, the amount of the conductive auxiliary present in the positive electrode is so small that a good electrical contact is not obtained between the positive electrode active material and the conductive auxiliary within the positive electrode and consequently battery characteristics are decreased at times. If, on the other hand, the content of the conductive auxiliary exceeds 1.5 parts by mass, the amount of the conductive auxiliary present in the positive electrode is so large that the electrode plate resistance of the positive electrode is decreased and consequently the positive electrode does not generate heat sufficiently. To increase the battery capacity by increasing the mixture density and also to attain enhancements in low-temperature characteristics by the generation of heat by the positive electrode, the content of the conductive auxiliary is more preferably not less than 0.75 parts by mass and not more than 1.25 parts by mass.

The binder may be a known binding agent, with examples including fluororesins such as polytetrafluoroethylene (PTFE), polyvinylidene fluoride (PVDF) and vinylidene fluoride (VDF)-hexafluoropropylene (HFP) copolymer; polyolefin resins such as polyethylene and polypropylene; polyamide resins such as aramid; and rubbery materials such as styrene-butadiene rubber and acrylic rubber. The binders may be used singly, or two or more may be used in combination.

The content of the binder in the positive electrode (the positive electrode mixture layer) is suitably, for example, not more than 10 parts by mass per 100 parts by mass of the positive electrode active material. To increase the battery capacity by increasing the mixture density, the amount of the binder is preferably not more than 5 parts by mass, and more preferably not more than 3 parts by mass. The lower limit of the content of the binder is not particularly limited, and the amount may be, for example, 0.01 part by mass or below per 100 parts by mass of the positive electrode active material.

Examples of the thickeners include cellulose derivatives such as carboxymethyl cellulose (CMC); $C_{2-4}$ polyalkylene glycols such as polyethylene glycol and ethylene oxide-propylene oxide copolymer; polyvinyl alcohols; and solubilized modified rubbers. The thickeners may be used singly, or two or more may be used in combination.

The proportion of the thickener is not particularly limited, and is preferably, for example, not less than 0 part by mass and not more than 10 parts by mass, or more preferably not less than 0.01 part by mass and not more than 5 parts by mass per 100 parts by mass of the positive electrode active material.

The dispersion medium is not particularly limited. Examples thereof include water, alcohols such as ethanol, ethers such as tetrahydrofuran, amides such as dimethylformamide, N-methyl-2-pyrrolidone (NMP), and mixtures of these solvents.

The thickness of the positive electrode mixture layers is preferably, for example, 20 to 100 μm, more preferably 30 to 90 μm, and particularly preferably 50 to 80 μm per side of the positive electrode current collector. The mixture density in the positive electrode mixture layers is preferably, for example, 3.3 to 4.0 g/cm$^3$, more preferably 3.5 to 3.9 g/cm$^3$, and particularly preferably 3.6 to 3.8 g/cm$^3$ in terms of the average of the entirety of the positive electrode mixture layers.

The ratio of the positive electrode active material in the inside of the battery case is preferably not less than 25 parts by volume relative to the total volume of the battery case taken as 100 parts by volume. The total volume of the battery case means the volume of the space in the battery case in which the electrode assembly is accommodated.

[Negative Electrodes]

Similarly to the positive electrode current collector, the negative electrode current collector may be a nonporous or porous conductive substrate. The thickness of the negative electrode current collector may be selected from the same range as the thickness of the positive electrode current collector. Examples of the metal materials used as the negative electrode current collectors include stainless steel, nickel, copper, copper alloys, aluminum and aluminum alloys. In particular, among others, copper and copper alloys are preferable.

The negative electrode mixture layers, which are described later, include, for example, a negative electrode active material and a binder. In addition to these components, additives such as a conductive auxiliary and a thickener may be added as required. The negative electrode may be formed in accordance with the method by which the positive electrode is formed. Specifically, the negative electrode may be obtained by applying a negative electrode mixture slurry which includes negative electrode mixture layer components such as the negative electrode active material and a binder in a dispersion medium, to a surface of the negative electrode current collector, and rolling and drying the resultant coating to form a negative electrode mixture layer on the surface of the negative electrode current collector.

The negative electrode active material may be a known negative electrode active material capable of storing and releasing lithium ions. Examples of the negative electrode active materials include various carbonaceous materials such as, for example, graphites (such as natural graphite, artificial graphite and graphitized mesophase carbon), cokes, semi-graphitized carbons, graphitized carbon fibers and amorphous carbons.

Examples of the negative electrode active materials further include chalcogen compounds capable of storing and releasing lithium ions at a lower potential than the positive electrode potential such as transition metal oxides and transition metal sulfides; silicon; silicon-containing compounds such as silicon oxides $SiO_x$ (0.05<x<1.95) and silicides; and lithium alloys and various alloy composition materials containing at least one selected from the group consisting of tin, aluminum, zinc and magnesium.

The negative electrode active materials may be used singly, or two or more may be used in combination. To allow the positive electrode active material to occupy an increased proportion of the volume of the battery case, it is preferable to use a material having a high specific capacity as the negative electrode active material. For example, it is preferable to use a negative electrode active material including a carbon material and $SiO_x$ (0.5≤x≤1.5). To attain enhancements in cycle characteristics and battery safety, it is more preferable that the ratio of the $SiO_x$ be not less than 2 parts by mass and not more than 50 parts by mass, and particularly preferably not less than 4 parts by mass and not more than 20 parts by mass relative to the total mass of the carbon material and the $SiO_x$ taken as 100 parts by mass.

If the ratio of the $SiO_x$ is less than 2 parts by mass, the positive electrode active material comes to occupy a reduced proportion of the inside of the battery case so that the amount of heat generated by the positive electrode in the battery case is decreased, resulting in insufficient enhancements in low-temperature characteristics. If, on the other hand, the ratio of the $SiO_x$ exceeds 50 parts by mass, the swelling and shrinkage of the $SiO_x$ during charging and discharging exert a very significant influence on the negative electrode mixture layer (such as a separation between the negative electrode current collector and the negative electrode mixture layer), resulting in a decrease in cycle characteristics.

The surface of the $SiO_x$ may be coated with carbon. Because the $SiO_x$ has low electron conductivity, its electron conductivity may be increased by coating the surface with carbon.

Examples of the binders, the dispersion media, the conductive auxiliaries and the thickeners used in the negative electrode may be similar to those mentioned with respect to the positive electrode. The amounts of the components relative to the active material may be selected from the same ranges as mentioned with respect to the positive electrode.

The thickness of the negative electrode mixture layers, in the case where the negative electrode active material is a carbon material such as graphite or includes a carbon material and $SiO_x$, is preferably, for example, 40 to 120 m, more preferably 50 to 110 μm, and particularly preferably 70 to 100 μm per side of the negative electrode current collector.

In the case where the negative electrode active material is a carbon material such as graphite or includes a carbon material and $SiO_x$, the mixture density in the negative electrode is preferably 1.3 to 1.9 g/cm$^3$, more preferably 1.4 to 1.8 g/cm$^3$, and particularly preferably 1.5 to 1.7 g/cm$^3$ in terms of the average of the entirety of the mixture layers.

When the negative electrode active material is other than those described above, for example, such a negative electrode active material as silicon, tin, aluminum, zinc or magnesium, the thickness and the mixture density of the negative electrode mixture layers may be outside the aforementioned ranges and may be controlled appropriately.

[Separators]

Examples of the separators disposed between the positive electrode and the negative electrode include microporous films, nonwoven fabrics and woven fabrics made of resins. In particular, the base materials for forming the separators may be, for example, polyolefins such as polyethylene and polypropylene in order to obtain an enhancement in safety by the shutdown function. To prevent the degradation of the separators by the heat generated by the positive electrode during discharging under high temperature conditions, it is preferable that the surface of the separator opposed to the positive electrode be provided with a heat resistant layer including a heat resistant material. Examples of the heat resistant materials include polyamide resins such as aliphatic polyamides and aromatic polyamides (aramids); and polyimide resins such as polyamidimides and polyimides.

[Nonaqueous Electrolytes]

The solvent in the nonaqueous electrolyte is not particularly limited and may be any of the solvents conventionally used in nonaqueous electrolyte secondary batteries. Examples include cyclic carbonates such as ethylene carbonate, propylene carbonate, butylene carbonate and vinylene carbonate, chain carbonates such as dimethyl carbonate, ethyl methyl carbonate and diethyl carbonate, ester-containing compounds such as methyl acetate, ethyl acetate, propyl acetate, methyl propionate, ethyl propionate, γ-butyrolactone and γ-valerolactone, sulfone group-containing compounds such as propanesultone, ether-containing compounds such as 1,2-dimethoxyethane, 1,2-diethoxyethane, tetrahydrofuran, 1,2-dioxane, 1,4-dioxane and 2-methyltetrahydrofuran, nitrile-containing compounds such as butyronitrile, valeronitrile, n-heptanenitrile, succinonitrile, glutaronitrile, adiponitrile, pimelonitrile, 1,2,3-propanetricarbonitrile and 1,3,5-pentanetricarbonitrile, and amide-containing compounds such as dimethylformamide. In particular, these solvents which are partially substituted with F in place of H may be preferably used. These solvents may be used singly, or a plurality of solvents may be used in combination. In particular, a preferred solvent is a combination of a cyclic carbonate and a chain carbonate, or a combination of the above combination with a small amount of a nitrile-containing compound or an ether-containing compound.

The nonaqueous solvent in the nonaqueous electrolyte may be an ionic liquid. In this case, the cation species and the anion species are not particularly limited. From the points of view of low viscosity, electrochemical stability and hydrophobicity, a particularly preferred combination involves a pyridinium cation, an imidazolium cation or a quaternary ammonium cation as the cation and a fluorine-containing imide anion as the anion.

The solute used in the nonaqueous electrolyte may be a known lithium salt generally used in conventional nonaqueous electrolyte secondary batteries. Examples of such lithium salts include those lithium salts containing one or more elements of P, B, F, O, S, N and Cl. Specific examples include $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$ and mixtures of these lithium salts. Of the lithium salts, lithium salts of fluorine-containing acids, in particular $LiPF_6$, are preferable because they are easily dissociated and are chemically stable in the nonaqueous electrolyte.

The concentration of the solute is not particularly limited but is desirably 0.8 to 1.7 mol per 1 liter of the nonaqueous electrolytic solution. For use in applications which require discharging at a large current, the concentration of the solute is desirably 1.0 to 1.6 mol per 1 liter of the nonaqueous electrolytic solution.

The nonaqueous electrolyte may contain known additives as required, for example, cyclohexylbenzene and diphenyl ether.

(Other Constituents)

Examples of the materials of the positive electrode leads and the negative electrode leads include the respective metal materials mentioned as the positive electrode current collectors and the negative electrode current collectors. Specifically, such materials as aluminum plates may be used as the positive electrode leads, and such materials as nickel plates and copper plates may be used as the negative electrode leads. Further, clad leads may be used as the negative electrode leads.

Hereinbelow, the nonaqueous electrolyte secondary batteries according to one aspect of the invention will be described in detail based on various experimental examples. The experimental examples presented below only illustrate some examples of the nonaqueous electrolyte secondary batteries to give a concrete form to the technical idea of the present invention, and thus do not intend to limit the scope of the invention to any of such experimental examples. The present invention may be carried out while adding appropriate modifications to these experimental examples without departing from the scope of the invention.

FIRST EXPERIMENTAL EXAMPLES

Experimental Example 1

[Fabrication of Positive Electrode]

First, a positive electrode mixture slurry was prepared by stirring 100 parts by mass of particles of lithium nickel cobalt aluminum oxide represented by $LiNi_{0.82}Co_{0.15}Al_{0.03}O_2$ as a positive electrode active material (a lithium transition metal oxide), 0.75 parts by mass of acetylene black as a conductive auxiliary, 0.675 parts by mass of polyvinylidene fluoride as a binder and an appropriate amount of N-methylpyrrolidone (NMP) with a kneader. Next, the positive electrode mixture slurry was applied to both sides of an aluminum foil (15 μm thick) as a positive electrode current collector. The coated foil was rolled and was thereafter dried.

Figure 2:
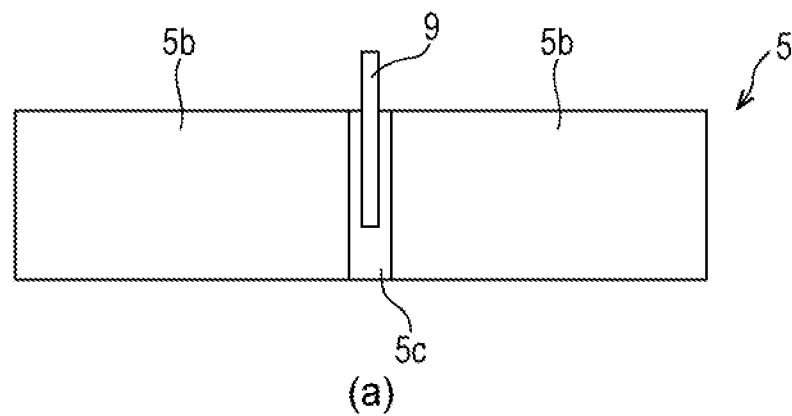
Figure 2:
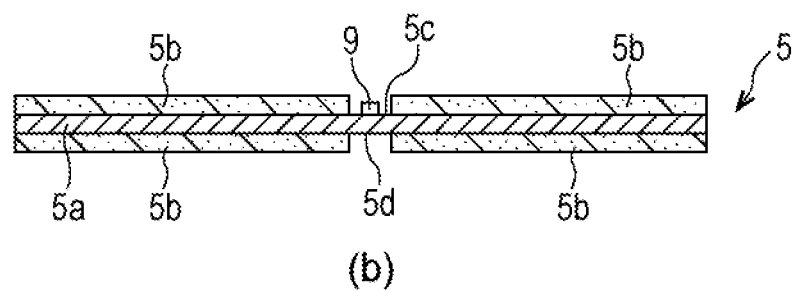
Figure 2:
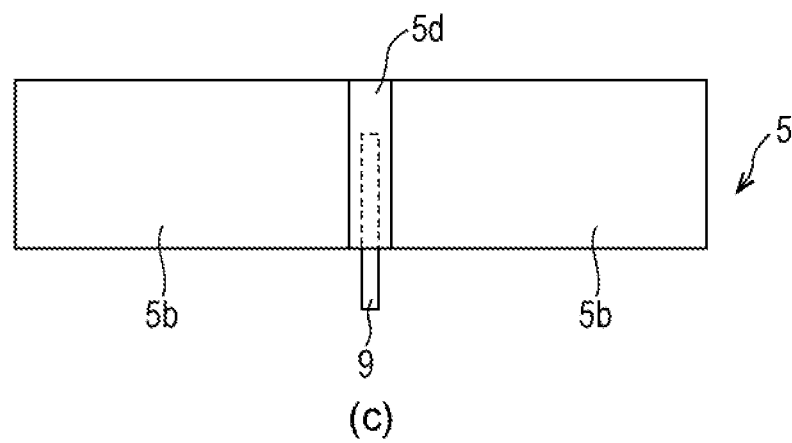

The dried foil was cut to a size 58.2 mm in coated width and 558.4 mm in coated length. In this manner, a positive electrode 5 was fabricated which had the positive electrode mixture layers 5b on both sides of the positive electrode current collector 5a as illustrated in FIG. 2. In the positive electrode 5, the thickness of the positive electrode mixture layers 5b was 74.4 μm per side and the density of the positive electrode mixture was 3.71 g/cm³. As a result of drying, portions 5c and 5d of the current collector which were 6.5 mm in width were not coated with the positive electrode mixture slurry and were exposed on both sides of the positive electrode 5 at central regions in the longitudinal direction. An end of a positive electrode lead 9 that was made of aluminum and had a width of 3.5 mm and a thickness of 0.15 mm was welded to the exposed portion 5c of the current collector.

[Fabrication of Negative Electrode]

First, a negative electrode mixture slurry was prepared by stirring 100 parts by mass of graphite as a negative electrode active material, 1.0 part by mass of styrene butadiene rubber as a binder and an appropriate amount of CMC with a kneader. Next, the negative electrode mixture slurry was applied to both sides of a long copper foil (8 μm thick) as a negative electrode current collector. The coated foil was rolled with a pair of rolls and was thereafter dried.

Figure 3:
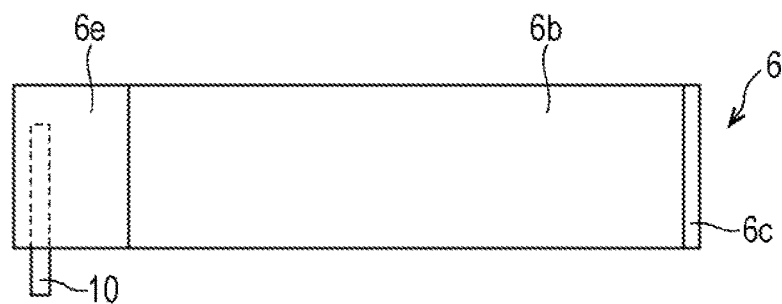
Figure 3:
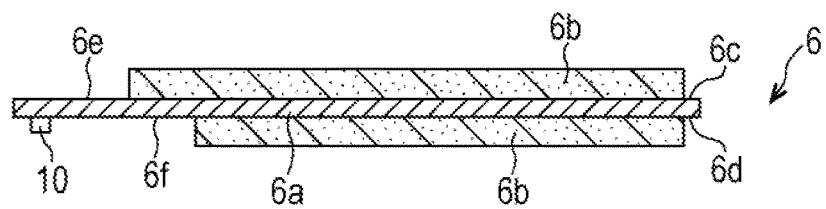
Figure 3:
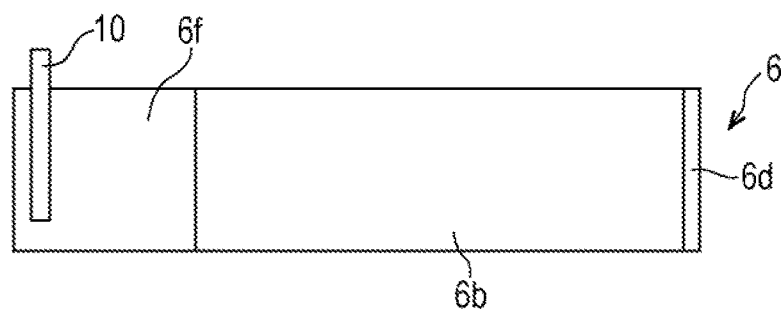

The dried foil was cut to a size 59.2 mm in coated width and 628.5 mm in coated length. In this manner, a negative electrode 6 was fabricated which had the negative electrode mixture layers 6b on both sides of the negative electrode current collector 6a as illustrated in FIG. 3. In the negative electrode 6, the thickness 6b of the negative electrode mixture layers was 94.9 μm per side and the density of the negative electrode mixture was 1.69 g/cm³. At one end of the negative electrode 6 in the longitudinal direction, portions 6c and 6d of the current collector having a width of 2.0 mm were exposed on both sides. At the other end of the negative electrode 6 in the longitudinal direction, a portion 6e of the current collector having a width of 21.0 mm was exposed on one side, and a portion 6f of the current collector having a width of 74.0 mm was exposed on the other side. An end of a negative electrode lead (a clad lead) 10 that was Ni/Cu/Ni=25/50/25 having a width of 3.0 mm and a thickness of 0.10 mm was welded to the exposed portion 6f of the current collector.

[Fabrication of Electrode Assembly]

A microporous polyethylene membrane separator 7 which had a heat resistant layer including an aramid resin as a heat resistant material on one side was interposed between the positive electrode 5 and the negative electrode 6 obtained above so that the heat resistant layer faced the positive electrode. These layers were then wound into a coil as an electrode assembly 4. The separator 7 had a size 61.6 mm in width, 635.0 mm in length and 16.5 μm in thickness.

[Preparation of Nonaqueous Electrolyte]

Lithium hexafluorophosphate ($LiPF_6$) was dissolved into a 20:5:75 by volume solvent mixture of ethylene carbonate, ethyl methyl carbonate and dimethyl carbonate so that the concentration would be 1.40 mol/L. Further, vinylene carbonate was dissolved in 4 parts by mass relative to the solvent mixture. In this manner, a nonaqueous electrolyte was prepared.

[Fabrication of Battery]

The electrode assembly 4 was placed into a bottomed cylindrical metallic battery case 1 having an inner diameter of 17.94 mm and a height of 64.97 mm. The free end of the positive electrode lead 9 leading out from the electrode assembly 4 was welded to a sealing plate 2, and the free end of the negative electrode lead 10 was welded to the inner bottom surface of the battery case 1. Next, an inwardly protrudent step 11 was formed on the sidewall of the battery case 1 above the top surface of the electrode assembly 4, and thereby the electrode assembly 4 was held within the battery case 1. Next, 5.35 g of the nonaqueous electrolyte was poured into the battery case 1, and the open end of the battery case 1 was crimped together with a peripheral portion of the sealing plate 2 via a gasket 3 to form a seal. In this manner, a cylindrical nonaqueous electrolyte secondary battery was fabricated.

The battery fabricated above will be written as the battery A1 hereinbelow. The ratio of the lithium nickel cobalt aluminum oxide was 24.70 parts by volume in the inside of the battery case. The ratio of occupancy was determined by the following method.

First, the total mass of the lithium nickel cobalt aluminum oxide present in the battery case was calculated. The mass was then multiplied by the true density of the lithium nickel cobalt aluminum oxide to determine the volume of the lithium nickel cobalt aluminum oxide. Next, the total volume of the inside of the battery case (the volume of the space in the battery case in which the electrode assembly was accommodated) was obtained. From this total volume of the inside of the battery case and the volume of the lithium nickel cobalt aluminum oxide determined above, the ratio of the lithium nickel cobalt aluminum oxide relative to the total volume of the inside of the battery case was determined.

In EXPERIMENTAL EXAMPLES 2 to 13 described below, the conditions such as the percentages (mol %) of Ni, Co and Al present in the lithium transition metal oxide, the content of the conductive auxiliary and the type of the negative electrode active material were different from EXPERIMENTAL EXAMPLE 1. These differences caused variations in thickness and mixture density in the positive electrode and negative electrode mixture layers. Consequently, the electrode assemblies fabricated in these EXPERIMENTAL EXAMPLES had different sizes at times. To compensate for such variations, EXPERIMENTAL EXAMPLES 2 to 13 described below involved appropriate adjustments of the lengths of the positive electrode, the negative electrode and the separator so that the electrode assemblies would have an identical size relative to the battery case.

Experimental Example 2

A nonaqueous electrolyte secondary battery was fabricated in the same manner as in EXPERIMENTAL EXAMPLE 1, except that the negative electrode active material used in the fabrication of the negative electrode was changed from 100 parts by mass of graphite to a mixture of 98 parts by mass of graphite and 2 parts by mass of SiO. In the dried negative electrode, the thickness of the negative electrode mixture layers was 87.3 μm per side and the density of the negative electrode mixture was 1.69 g/cm³.

The battery thus fabricated will be written as the battery A2 hereinbelow.

Experimental Example 3

A nonaqueous electrolyte secondary battery was fabricated in the same manner as in EXPERIMENTAL EXAMPLE 1, except that the negative electrode active material used in the fabrication of the negative electrode was changed from 100 parts by mass of graphite to a mixture of 96 parts by mass of graphite and 4 parts by mass of SiO. In the dried negative electrode, the thickness of the negative electrode mixture layers was 84.8 μm per side and the density of the negative electrode mixture was 1.68 g/cm³.

The battery thus fabricated will be written as the battery A3 hereinbelow.

Experimental Example 4

A battery was fabricated in the same manner as in EXPERIMENTAL EXAMPLE 1, except that the lithium nickel cobalt aluminum oxide $LiNi_{0.82}Co_{0.15}Al_{0.03}O_2$ used in the fabrication of the positive electrode was replaced by lithium nickel cobalt aluminum oxide represented by $LiNi_{0.88}Co_{0.09}Al_{0.03}O_2$. In the dried positive electrode, the thickness of the positive electrode mixture layers was 71.3 μm per side and the density of the positive electrode mixture was 3.71 g/cm³.

The battery thus fabricated will be written as the battery A4 hereinbelow.

Experimental Example 5

A nonaqueous electrolyte secondary battery was fabricated in the same manner as in EXPERIMENTAL EXAMPLE 4, except that the negative electrode active material used in the fabrication of the negative electrode was changed from 100 parts by mass of graphite to a mixture of 96 parts by mass of graphite and 4 parts by mass of SiO. In the dried negative electrode, the thickness of the negative electrode mixture layers was 82.2 μm per side and the density of the negative electrode mixture was 1.68 g/cm³.

The battery thus fabricated will be written as the battery A5 hereinbelow.

Experimental Example 6

A nonaqueous electrolyte secondary battery was fabricated in the same manner as in EXPERIMENTAL EXAMPLE 4, except that the negative electrode active material used in the fabrication of the negative electrode was changed from 100 parts by mass of graphite to a mixture of 93 parts by mass of graphite and 7 parts by mass of SiO. In the dried negative electrode, the thickness of the negative electrode mixture layers was 75.3 μm per side and the density of the negative electrode mixture was 1.63 g/cm$^3$.

The battery thus fabricated will be written as the battery A6 hereinbelow.

Experimental Example 7

A battery was fabricated in the same manner as in EXPERIMENTAL EXAMPLE 1, except that the lithium nickel cobalt aluminum oxide $LiNi_{0.82}Co_{0.15}Al_{0.03}O_2$ used in the fabrication of the positive electrode was replaced by lithium nickel cobalt aluminum oxide represented by $LiNi_{0.91}Co_{0.06}Al_{0.03}O_2$. In the dried positive electrode, the thickness of the positive electrode mixture layers was 69.9 m per side and the density of the positive electrode mixture was 3.71 g/cm$^3$.

The battery thus fabricated will be written as the battery A7 hereinbelow.

Experimental Example 8

A nonaqueous electrolyte secondary battery was fabricated in the same manner as in EXPERIMENTAL EXAMPLE 7, except that the negative electrode active material used in the fabrication of the negative electrode was changed from 100 parts by mass of graphite to a mixture of 93 parts by mass of graphite and 4 parts by mass of SiO. In the dried negative electrode, the thickness of the negative electrode mixture layers was 76.2 μm per side and the density of the negative electrode mixture was 1.68 g/cm$^3$.

The battery thus fabricated will be written as the battery A8 hereinbelow.

Experimental Example 9

A nonaqueous electrolyte secondary battery was fabricated in the same manner as in EXPERIMENTAL EXAMPLE 7, except that the negative electrode active material used in the fabrication of the negative electrode was changed from 100 parts by mass of graphite to a mixture of 95 parts by mass of graphite and 5 parts by mass of SiO. In the dried negative electrode, the thickness of the negative electrode mixture layers was 80.0 μm per side and the density of the negative electrode mixture was 1.66 g/cm$^3$.

The battery thus fabricated will be written as the battery A9 hereinbelow.

Experimental Example 10

A nonaqueous electrolyte secondary battery was fabricated in the same manner as in EXPERIMENTAL EXAMPLE 7, except that the negative electrode active material used in the fabrication of the negative electrode was changed from 100 parts by mass of graphite to a mixture of 93 parts by mass of graphite and 7 parts by mass of SiO. In the dried negative electrode, the thickness of the negative electrode mixture layers was 75.2 μm per side and the density of the negative electrode mixture was 1.63 g/cm$^3$.

The battery thus fabricated will be written as the battery A10 hereinbelow.

(Experiments)

[Measurement of Rated Capacity]

At a temperature of 25° C., the batteries A1 to A10 fabricated above were each charged at a constant current of 0.5-hour rate until the battery voltage reached 4.2 V and was charged at a constant voltage of 4.2 V until a final current of 0.02-hour rate was reached. After a rest of 20 minutes, the battery was discharged at a constant current of 1-hour rate until the battery voltage reached 2.5 V. The discharge capacity was measured, and the result was obtained as the rated capacity of the battery.

[Measurement of Low-Temperature Characteristics]

Next, at a temperature of 25° C., the batteries A1 to A10 were each charged at a constant current of 0.5-hour rate until the battery voltage reached 4.2 V and was charged at a constant voltage of 4.2 V until a final current of 0.02-hour rate was reached. After a rest of 6 hours at a temperature of −10° C., the battery was discharged at a constant current of 1-hour rate until the battery voltage reached 2.5 V. The low-temperature discharge capacity was measured. The ratio of the low-temperature discharge capacity to the rated capacity was determined. The ratios were expressed as values relative to the ratio of the low-temperature discharge capacity of the battery A1 taken as 100%. The results are described as low-temperature characteristics of the batteries in Table 1.

TABLE 1

| Battery | Composition of positive electrode active material | Amount of conductive agent (parts by mass) | Ratio of $SiO_x$ (parts by mass) | Ratio of positive electrode active material to battery case (parts by volume) | Ratio of low-temperature discharge capacity (%) |
|---|---|---|---|---|---|
| A1 | $LiNi_{0.82}Co_{0.15}Al_{0.03}O_2$ | 0.75 | 0 | 24.70 | 100.0 |
| A2 | $LiNi_{0.82}Co_{0.15}Al_{0.03}O_2$ | 0.75 | 2 | 25.34 | 100.1 |
| A3 | $LiNi_{0.82}Co_{0.15}Al_{0.03}O_2$ | 0.75 | 4 | 25.79 | 100.0 |
| A4 | $LiNi_{0.88}Co_{0.09}Al_{0.03}O_2$ | 0.75 | 0 | 23.68 | 101.5 |
| A5 | $LiNi_{0.88}Co_{0.09}Al_{0.03}O_2$ | 0.75 | 4 | 25.90 | 102.6 |
| A6 | $LiNi_{0.88}Co_{0.09}Al_{0.03}O_2$ | 0.75 | 7 | 26.73 | 106.7 |
| A7 | $LiNi_{0.91}Co_{0.06}Al_{0.03}O_2$ | 0.75 | 0 | 23.20 | 103.0 |
| A8 | $LiNi_{0.91}Co_{0.06}Al_{0.03}O_2$ | 0.75 | 4 | 25.36 | 104.9 |
| A9 | $LiNi_{0.91}Co_{0.06}Al_{0.03}O_2$ | 0.75 | 5 | 26.07 | 104.0 |
| A10 | $LiNi_{0.91}Co_{0.06}Al_{0.03}O_2$ | 0.75 | 7 | 27.33 | 109.5 |

As clear from Table 1, the comparison of the batteries A4 to A6 in which the percentage of Ni was 88 mol % and the content of the conductive auxiliary was 0.75 mass % shows that the batteries A5 and A6 in which the positive electrode active material occupied not less than 25 parts by volume in the battery case had a higher ratio of the low-temperature discharge capacity and thus attained excellent low-temperature characteristics as compared to the battery A4 in which the ratio of the positive electrode active material was less than 25 parts by volume in the inside of the battery case. Similarly in the case of the batteries A7 to A10 in which the percentage of Ni was 91 mol %, the batteries A8 to A10 in which the positive electrode active material occupied not less than 25 parts by volume in the battery case had a higher ratio of the low-temperature discharge capacity as compared to the battery A7 in which the ratio of the positive electrode active material was less than 25 parts by volume in the inside of the battery case. In the case of, however, the batteries A1 to A3 in which the percentage of Ni was 82%, the batteries A2 and A3 satisfied the condition that the ratio of the positive electrode active material was not less than 25 parts by volume in the inside of the battery case, but their ratios of the low-temperature discharge capacity were not enhanced and were similar to that obtained with the battery A1 in which the positive electrode active material occupied less than 25 parts by volume in the battery case. The reasons for these results are not clear but are probably as described below.

In the batteries A1 to A3, the percentage of Ni was 82 mol %, whilst the percentage of Ni in the batteries A4 to A6 was 88 mol % and the percentage of Ni in the batteries A7 to A10 was 91 mol %. Because of such a low percentage of Ni, the powder resistivity was low and the electrode plate resistance of the positive electrode was low. Because of this, the positive electrode probably failed to generate heat sufficiently and consequently enhancements in low-temperature characteristics were not obtained even when the positive electrode active material occupied not less than 25 parts by volume in the battery case. The batteries A1 to A3 exhibited similar values of low-temperature characteristics in spite of the fact that the ratios of the positive electrode active material occupying the inside of the battery case were different and hence the amounts of heat generated by the positive electrode in the battery case were different. The reason for these results is probably because the lithium transition metal oxide having a percentage of Ni of 82 mol % had a small dependence of discharge characteristics on temperature as compared to the lithium transition metal oxides in which the percentage of Ni was 88 mol % or above, and therefore the generation of heat by the positive electrode had little influence in terms of enhancing low-temperature characteristics.

In contrast, the percentage of Ni in the batteries A5 and A6 was as high as 88 mol % and thus the powder resistivity of the lithium transition metal oxide was higher. The increase in the electrode plate resistance of the positive electrode probably allowed the positive electrode to generate more heat. Further, the lithium transition metal oxide having a percentage of Ni of 88 mol % had a large dependence of discharge characteristics on temperature. Probably because of this fact, the generation of heat by the positive electrode resulted in enhancements in low-temperature characteristics. The enhancements in low-temperature characteristics were obtained by the generation of heat by the positive electrode in the batteries A8 to A10 probably for the same reasons as in the batteries A5 and A6.

SECOND EXPERIMENTAL EXAMPLES

Experimental Example 11

A nonaqueous electrolyte secondary battery was fabricated in the same manner as in EXPERIMENTAL EXAMPLE 1, except that the amount of acetylene black used as the conductive auxiliary in the fabrication of the positive electrode was changed from 0.75 parts by mass to 1.00 part by mass. In the dried positive electrode, the thickness of the positive electrode mixture layers was 74.9 μm per side and the density of the positive electrode mixture was 3.73 g/cm$^3$.

The battery thus fabricated will be written as the battery B1 hereinbelow.

Experimental Example 12

A nonaqueous electrolyte secondary battery was fabricated in the same manner as in EXPERIMENTAL EXAMPLE 5, except that the amount of acetylene black used as the conductive auxiliary in the fabrication of the positive electrode was changed from 0.75 parts by mass to 1.00 part by mass. In the dried positive electrode, the thickness of the positive electrode mixture layers was 71.9 μm per side and the density of the positive electrode mixture was 3.73 g/cm$^3$.

The battery thus fabricated will be written as the battery B2 hereinbelow.

Experimental Example 13

A nonaqueous electrolyte secondary battery was fabricated in the same manner as in EXPERIMENTAL EXAMPLE 5, except that the amount of acetylene black used as the conductive auxiliary in the fabrication of the positive electrode was changed from 0.75 parts by mass to 1.25 parts by mass. In the dried positive electrode, the thickness of the positive electrode mixture layers was 72.5 μm per side and the density of the positive electrode mixture was 3.74 g/cm$^3$.

The battery thus fabricated will be written as the battery B3 hereinbelow.

Experimental Example 14

A nonaqueous electrolyte secondary battery was fabricated in the same manner as in EXPERIMENTAL EXAMPLE 8, except that the amount of acetylene black used as the conductive auxiliary in the fabrication of the positive electrode was changed from 0.75 parts by mass to 1.25 parts by mass. In the dried positive electrode, the thickness of the positive electrode mixture layers was 66.6 μm per side and the density of the positive electrode mixture was 3.74 g/cm$^3$.

The battery thus fabricated will be written as the battery B4 hereinbelow.

Experimental Example 15

A nonaqueous electrolyte secondary battery was fabricated in the same manner as in EXPERIMENTAL EXAMPLE 8, except that the amount of acetylene black used as the conductive auxiliary in the fabrication of the positive electrode was changed from 0.75 parts by mass to 1.40 parts by mass. In the dried positive electrode, the thickness of the positive electrode mixture layers was 66.1 μm per side and the density of the positive electrode mixture was 3.75 g/cm³.

The battery thus fabricated will be written as the battery B5 hereinbelow.

The batteries B1 to B5 were each tested in the same manner as the batteries A1 to A10 to determine the ratio of the low-temperature discharge capacity to the rated capacity. The ratios were expressed as values relative to the ratio of the low-temperature discharge capacity of the battery A1 taken as 100%. The results are described as low-temperature characteristics of the batteries in Table 2.

TABLE 2

| Battery | Composition of positive electrode active material | Amount of conductive agent (parts by mass) | Ratio of $SiO_x$ (parts by mass) | Ratio of positive electrode active material to battery case (parts by volume) | Ratio of low-temperature discharge capacity (%) |
|---|---|---|---|---|---|
| A1 | $LiNi_{0.82}Co_{0.15}Al_{0.03}O_2$ | 0.75 | 0 | 24.70 | 100.0 |
| B1 | $LiNi_{0.82}Co_{0.15}Al_{0.03}O_2$ | 1.00 | 0 | 24.81 | 98.1 |
| A5 | $LiNi_{0.88}Co_{0.09}Al_{0.03}O_2$ | 0.75 | 4 | 25.90 | 102.6 |
| B2 | $LiNi_{0.88}Co_{0.09}Al_{0.03}O_2$ | 1.00 | 4 | 25.56 | 102.8 |
| B3 | $LiNi_{0.88}Co_{0.09}Al_{0.03}O_2$ | 1.25 | 4 | 25.73 | 102.3 |
| A8 | $LiNi_{0.91}Co_{0.06}Al_{0.03}O_2$ | 0.75 | 4 | 25.36 | 104.9 |
| B4 | $LiNi_{0.91}Co_{0.06}Al_{0.03}O_2$ | 1.25 | 4 | 25.71 | 104.2 |
| B5 | $LiNi_{0.91}Co_{0.06}Al_{0.03}O_2$ | 1.40 | 4 | 25.85 | 102.1 |

As clear from Table 2, similar low-temperature characteristics were obtained in the battery A5 and the batteries B2 and B3 which involved the lithium transition metal oxide having a percentage of Ni of 88 mol % and contained the conductive auxiliary in an amount of 0.75 parts by mass, 1.00 part by mass or 1.25 parts by mass, respectively. These results show that enhancements in low-temperature characteristics are obtained when the content of the conductive auxiliary is controlled to fall in the above range. The low-temperature characteristics were similar also between the battery A8 and the battery B4 which involved the lithium transition metal oxide having a percentage of Ni of 91 mol % and contained the conductive auxiliary in an amount of 0.75 parts by mass or 1.25 parts by mass, respectively. The battery B5 which involved the lithium transition metal oxide having a percentage of Ni of 91 mol % and contained the conductive auxiliary in an amount of 1.40 parts by mass was poor in low-temperature characteristics as compared to the battery A8 and the battery B4. These results show that enhancements in low-temperature characteristics are obtained when the content of the conductive auxiliary is controlled to not less than 0.75 parts by mass and not more than 1.25 parts by mass. In contrast, in the case where the lithium transition metal oxide used had a percentage of Ni of 82 mol %, the battery B1 which contained the conductive auxiliary in an amount of 1.00 part by mass failed to attain enhancements in low-temperature characteristics and its low-temperature characteristics were lower than those of the battery A1 which contained the conductive auxiliary in an amount of 0.75 parts by mass. The reasons for these results are not clear but are probably as described below.

In the battery A1 and the battery B1, the percentage of Ni was 82 mol %, whilst the percentage of Ni in the battery A5 and the batteries B2 and B3 was 88 mol % and the percentage of Ni in the battery A8 and the battery B4 was 91 mol %. Because of such a low percentage of Ni, the powder resistivity was low and the electrode plate resistance of the positive electrode was low, causing the amount of heat generated by the positive electrode to be small. In the battery B1, further, the content of the conductive auxiliary was 1.00 part by mass and thus the electrode plate resistance of the positive electrode was lower than that in the battery A1 in which the content of the conductive auxiliary was 0.75 parts by mass, resulting in a further reduction in the amount of heat generated by the positive electrode. The decrease in low-temperature characteristics is probably ascribed to these mechanisms. On the other hand, the battery A5 and the batteries B2 and B3 in which the percentage of Ni was 88 mol %, and the battery A8 and the battery B4 in which the percentage of Ni was 91 mol % had a higher powder resistivity than the battery A1 and the battery B1 in which the percentage of Ni was 82 mol %. In addition, the positive electrode active material occupied not less than 25 parts by volume in the battery case. With the proviso that the amount of the conductive auxiliary was in the range of 0.75 parts by mass to 1.25 parts by mass, these configurations probably allowed the positive electrode to generate a sufficient amount of heat and thus to realize enhancements in low-temperature characteristics.

The battery B5 which involved the lithium transition metal oxide having a percentage of Ni of 91 mol % and contained the conductive auxiliary in an amount of 1.40 parts by mass attained enhancements in low-temperature characteristics over the battery A1; however, the enhancements are not sufficient as compared to the results of the battery A8 and the battery B4.

THIRD EXPERIMENTAL EXAMPLES

Experimental Example 16

A battery was fabricated in the same manner as in EXPERIMENTAL EXAMPLE 5, except that the microporous polyethylene membrane separator used in the fabrication of the electrode assembly which had a heat resistant layer including an aramid resin as a heat resistant material on one side was replaced by a microporous polyethylene membrane separator which did not have any heat resistant aramid resin layer on the surface.

The battery thus fabricated will be written as the battery C1 hereinbelow.

The battery C1 was tested in the same manner as the batteries A1 to A10 to determine the ratio of the low-temperature discharge capacity to the rated capacity. The ratio was expressed as a value relative to the ratio of the low-temperature discharge capacity of the battery A1 taken as 100%. The results are described as low-temperature characteristics of the batteries in Table 3.

(Experiments)

[Measurement of High-Temperature Cycle Characteristics]

At a temperature of 45° C., the battery A5 and the battery C1 were each charged at a constant current of 0.7-hour rate until the battery voltage reached 4.2 V and was charged at a constant voltage of 4.2 V until a final current of 0.02-hour rate was reached. After a rest of 20 minutes, the battery was discharged at a constant current of 0.5-hour rate until the battery voltage reached 2.5 V, and was thereafter allowed to rest for 20 minutes. This cycle of charging and discharging was repeated 350 times, and the ratio of the discharge capacity in the 350th cycle to the discharge capacity in the 1st cycle (the capacity retention) was calculated. The capacity retentions obtained are described as the capacity retentions during high-temperature cycles in Table 3.

TABLE 3

| Battery | Composition of positive electrode active material | Amount of conductive auxiliary (parts by mass) | Ratio of SiO$_x$ (parts by mass) | Ratio of positive electrode active material to battery case (parts by volume) | Heat resistant layer in separator | Ratio of low-temperature discharge capacity (%) | Capacity retention during high-temperature cycles (%) |
|---|---|---|---|---|---|---|---|
| A5 | LiNi$_{0.88}$Co$_{0.09}$Al$_{0.03}$O$_2$ | 0.75 | 4 | 25.90 | Present | 102.6 | 76.7 |
| C1 | LiNi$_{0.88}$Co$_{0.09}$Al$_{0.03}$O$_2$ | 0.75 | 4 | 25.90 | Absent | 102.6 | 70.3 |

As clear from Table 3, the comparison of the battery A5 and the battery C1 in which the percentage of Ni was 88 mol %, the content of the conductive auxiliary was 0.75 parts by mass and the positive electrode active material occupied not less than 25 parts by volume in the battery case shows that the battery A5 which had a heat resistant layer including a heat resistant material on the surface of the separator opposed to the positive electrode had a higher capacity retention during high-temperature cycles and thus attained excellent high-temperature cycle characteristics as compared to the battery C1 which did not have any heat resistant layer including a heat resistant material. The reason for these results is probably because the heat resistant layer including a heat resistant material disposed on the surface of the separator opposed to the positive electrode prevented the degradation of the separator by the heat generated by the positive electrode during discharging under high-temperature conditions. Specifically, the heat resistant layer prevented the heat generated by the positive electrode from being transferred to the separator, and thus prevented a decrease in high-temperature cycle characteristics. Probably because of this effect, enhancements were obtained in both low-temperature characteristics and high-temperature cycle characteristics.

While the experimental examples discussed above have illustrated the ratio of the positive electrode active material to the inside volume of the battery case as being changed by altering the proportion of the high-specific capacity material SiO$_x$ in the negative electrode active material, the ratio of the positive electrode active material occupying the inside of the battery case may be changed by other methods.

INDUSTRIAL APPLICABILITY

The batteries according to an aspect of the present invention are expected to find use, for example, in power supplies for driving of mobile information terminals such as cellphones, laptop computers and smartphones, in power supplies with high capacity and excellent low-temperature characteristics for driving of BEV, PHEV and HEV, and in storage-related power supplies.

REFERENCE SIGNS LIST

1 BATTERY CASE
2 SEALING PLATE
3 GASKET
4 ELECTRODE ASSEMBLY
5 POSITIVE ELECTRODE
5a POSITIVE ELECTRODE CURRENT COLLECTOR
5b POSITIVE ELECTRODE MIXTURE LAYER
5c, 5d EXPOSED PORTIONS OF POSITIVE ELECTRODE CURRENT COLLECTOR
6 NEGATIVE ELECTRODE
6a NEGATIVE ELECTRODE CURRENT COLLECTOR
6b NEGATIVE ELECTRODE MIXTURE LAYER
6c, 6d, 6e, 6f EXPOSED PORTIONS OF NEGATIVE ELECTRODE CURRENT COLLECTOR
7 SEPARATOR
8a UPPER INSULATING RING
8b LOWER INSULATING RING
9 POSITIVE ELECTRODE LEAD
10 NEGATIVE ELECTRODE LEAD
11 STEP

The invention claimed is:

1. A nonaqueous electrolyte secondary battery comprising a positive electrode, a negative electrode, a separator, a nonaqueous electrolyte and a battery case accommodating the battery constituents, the positive electrode having a positive electrode mixture layer including a lithium transition metal oxide containing at least Ni, and a conductive auxiliary, wherein the lithium transition metal oxide is an oxide represented by the general formula: Li$_a$Ni$_x$M$_{1-x}$O$_2$ (wherein 0.95≤a≤1.2, 0.88≤x≤1.0, and M is at least one element selected from Co, Mn and Al).

the content of the conductive auxiliary being not less than 0.75 parts by mass and not more than 1.25 parts by mass per 100 parts by mass of the lithium transition metal oxide, a volume of the lithium transition metal oxide obtained by multiplying a total mass of the lithium transition metal oxide by a true density of the lithium transition metal oxide being not less than 25% of a total volume of the inside of the battery case.

2. The nonaqueous electrolyte secondary battery according to claim 1, wherein the lithium transition metal oxide is an oxide represented by the general formula: Li$_a$Ni$_x$Co$_y$Al$_z$O$_2$ (wherein 0.95≤a≤1.2, 0.88≤x<1.0, 0<y<0.1, 0<z<0.1, and x+y+z=1.0).

3. The nonaqueous electrolyte secondary battery according to claim 1, wherein x in the general formula of the lithium transition metal oxide is 0.90<x 0.95.

4. The nonaqueous electrolyte secondary battery according to claim 1, wherein the negative electrode includes a carbon material and SiO$_x$ (0.5≤x≤1.5), as a negative electrode active material.

5. The nonaqueous electrolyte secondary battery according to claim 4, wherein the ratio of the $SiO_x$ is not less than 4 parts by mass and not more than 20 parts by mass relative to the total mass of the carbon material and the $SiO_x$.

6. The nonaqueous electrolyte secondary battery according to claim 1, wherein the separator is disposed between the positive electrode and the negative electrode, and the surface of the separator opposed to the positive electrode is provided with a heat resistant layer including a heat resistant material.

7. The nonaqueous electrolyte secondary battery according to claim 1, wherein the percentage of Ni in the total moles of metal element(s) except lithium present in the lithium transition metal oxide being not less than 91 mol %.

8. The nonaqueous electrolyte secondary battery according to claim 4, wherein a mixture density in the negative electrode is 1.3 to 1.9 $g/cm^3$ in terms of an average of an entirety of mixture layers.

* * * * *